(12) United States Patent
Bissegger

(10) Patent No.: US 6,629,802 B2
(45) Date of Patent: Oct. 7, 2003

(54) METHOD OF CONNECTING TWO PANELS OF A PIECE OF FURNITURE AND A PIECE OF FURNITURE UTILIZING SUCH A CONNECTION

(76) Inventor: Mario Bissegger, 6655, Intragna (CH)

( * ) Notice: Subject to any disclaimer, the term of this patent is extended or adjusted under 35 U.S.C. 154(b) by 0 days.

(21) Appl. No.: 09/984,739

(22) Filed: Oct. 31, 2001

(65) Prior Publication Data

US 2002/0051679 A1 May 2, 2002

(30) Foreign Application Priority Data

Oct. 31, 2000 (CH) .............................................. 2124/00

(51) Int. Cl.⁷ .............................................. F16B 21/00
(52) U.S. Cl. .................... 403/322.2; 312/111; 312/202; 384/610
(58) Field of Search ........................... 403/322.2, 322.1, 403/321; 384/610; 312/107, 111, 202, 249.2; 108/103

(56) References Cited

U.S. PATENT DOCUMENTS

| 2,100,658 A | * | 11/1937 | Finch ............................ 46/26 |
| 3,892,448 A | * | 7/1975 | Laing ........................... 308/230 |
| 4,026,065 A | * | 5/1977 | Dick .............................. 46/25 |
| 4,797,021 A | | 1/1989 | Stamper |
| 6,435,754 B1 | * | 8/2002 | Canale ..................... 403/109.2 |

FOREIGN PATENT DOCUMENTS

| DE | 19739040 | 3/1999 |
| FR | 2584904 | 1/1987 |
| WO | 92/05724 | 4/1992 |

* cited by examiner

Primary Examiner—Lloyd A. Gall
Assistant Examiner—Doug Hutton
(74) Attorney, Agent, or Firm—Greenblum & Bernstein, P.L.C.

(57) ABSTRACT

Method of connecting or joining at least two panels in a piece of furniture and a piece of furniture made thereby. The method includes providing a first panel, wherein the first panel includes a surface having at least one recess, providing a second panel, wherein the second panel includes a surface having at least one recess, arranging the surface of the first panel adjacent the surface of the second panel, and connecting the first panel to the second panel using at least one sphere. The at least one sphere projects into the at least one recess of each of the first and the second panels.

41 Claims, 7 Drawing Sheets

METHOD OF CONNECTING TWO PANELS OF A PIECE OF FURNITURE AND A PIECE OF FURNITURE UTILIZING SUCH A CONNECTION

CROSS-REFERENCE TO RELATED APPLICATIONS

The present application claims priority under 35 U.S.C. §119 of Swiss Patent Application No. 2000 2124/00, filed on Oct. 31, 2000, the disclosure of which is expressly incorporated by reference herein in its entirety.

BACKGROUND OF THE INVENTION

1. Field of the Invention

The present invention concerns an arrangement of conjunction based on form contact of two panels, and in particular, two essentially horizontal panels of a piece of furniture.

2. Description of Related Art

In manufacturing furniture and, in particular, in the manufacturing of furniture composed of a plurality of components such as racks, shelves, book shelves, and similar items, problems arise with arriving at an arrangement or system of joining individual components. Some of these problems relate to an inability of manufacturing and/or assembling the components quickly. Another problem relates to an inability of ensuring perfect positioning of the components and/or their absolute stability. It is also difficult to design a high degree of solidity to the whole piece of furniture, especially when it is also desired to manufacture furniture which does not cost too much. Another problem relates to designing the furniture so that it can be assembled, mounted, and/or dismantled without the use of special tools, i.e., in such a manner that any user without special skills can perform these operations.

Innumerable solutions are known according to the state of the art for solving some of these problems. The most common solutions, and the ones most commonly applied today, provide for the use of nuts and bolts for joining the furniture pieces. Another solution combines the use of special inserts. Such solutions are known to the specialist in the field, and presently also to many less experienced users. However, these solutions are characterized in that they are complicated to manufacture. They also create problems in handling, during assembly, and/or dismantling because they require the use of tools, and in many cases, the use of special devices.

According to the state of the art, conjunction systems are known for joining furniture components in which no nuts and bolts or inserts are used. Such systems thus come closer to an objective of the present invention. However, these systems have failed to offer many, if not all, the advantages found in the invention.

WO 92/05724 discloses a system for modular furniture with interchangeable components used for joining essentially horizontal furniture elements. This system uses cylindrical pins that are placed in the upper surfaces of the lower components so as to penetrate into corresponding cylindrical bores in the lower surfaces of the upper components. This arrangement, of course, could be switched the other way around as well, with the cylindrical pins being placed in the lower surfaces of the upper components so as to penetrate into corresponding cylindrical bores in the upper surfaces of the lower components. The disadvantage of this known system of joining two essentially horizontal panels relates to the fact that the pins must be placed into the panels (or to a part of the panels, respectively) so as to stick out or protrude therefrom. Such an arrangement always causes problems because damage can occur to the pins, as well as to other surfaces of the furniture components. Furthermore, it is obvious that the cylindrical pins, in order to allow for easy penetration into the corresponding cylindrical bores of the counter piece, must be positioned with greatest precision. This can prove especially difficult when the size of the panels is taken into account. Such a design is also vulnerable to variations in the positions and dimensions of the pins and bores which can vary as a result of air condition changes (e.g., humidity, temperature). This system of conjunction, which somehow resembles the well-known Lego® cubes, thus cannot satisfy many if not all the requirements in connection to the conjunction based on form contact of two essentially horizontal panels.

Another system of quick conjunction of elements to be joined is shown in U.S. Pat. No. 4,797,021. This arrangement uses a system, known as such from many applications in mechanics, of a ball or sphere which penetrates into a dilatable recess whose diameter is essentially smaller than the one of the sphere. As the sphere penetrates into the recess (which can be formed by an elastic rim as in the case shown there, or of a ring-shaped spring elastically deformable radially, which is inserted into the actual recess) there is provided a more or less fixed "snap-on" joint. According to such an arrangement, the two parts to be joined are blocked against each other and the arrangement can be considered as a fixation (in a proper sense) of the parts. The parts can indeed be separated from each other, but only by overcoming the radial force exerted by the rim of the recess, which is narrower than the ball or sphere. In one of the more common design examples provided, e.g. for joining linked activating rods of mechanisms, this solution, even if it remains a snap-on fixation, permits relative movements of one part against the other. Moreover, the center of the movement is the center of the sphere. This solution, in addition to the disadvantage of forming a "snap-on" fixation, and thus requiring the application of force to separate the components, represents a rather complicated solution. This is because of the deformation mechanism of the rim of the recess. This solution also causes problems with precision, such as when two panels are to be joined with two or more conjunction devices.

Another proposal, known from DE 197 39 040, provides for the possibility of assembling cube-shaped units in almost any configuration. Each face of the cube, which is open on one side so as to form a shelf, presents recesses which are symmetrically arranged on all faces in such a manner that as any desired faces of two cubes are joined, i.e., they can be joined using the recesses that correspond to each other. A connecting element in the form of a pin is also shown and this pin penetrates into a sleeve. This document is of interest in assembling pieces of furniture composed of a plurality of components. However, it is not of particular value concerning the system of conjunction because it does not go further than the fixed insert.

From French document FR 2 584 904, an arrangement for conjunction is known for furniture of variable geometry, in particular, for small low tables that can be extended. One or more lower parts of the table is/are connected with an upper part using movable rolls or movable spheres provided in suitable grooves. The purpose of this type of conjunction is to create a well defined freedom of movement of one part of the piece of furniture with respect to another one, i.e., this design merely provides for a to and from translation movement. The application of rolls or spheres in this arrangement does not serve for creating a stable conjunction between two elements, i.e., a guide arrangement only permits movement of one part relative to the other ones. Accordingly, this solution can not be applied for meeting the objective of the present invention as described herein.

SUMMARY OF THE INVENTION

The invention provides for a method of connecting or joining at least two panels in a piece of furniture. The method includes providing a first panel, wherein the first panel includes a surface having at least one recess, providing a second panel, wherein the second panel includes a surface having at least one recess, arranging the surface of the first panel adjacent the surface of the second panel, and connecting the first panel to the second panel using at least one sphere, wherein the sphere projects into the at least one recess of each of the first and the second panels.

One of the at least one recess of the first panel and the at least one recess of the second panel may comprise an approximately square shaped cross-sectional opening. The square shaped cross-sectional opening may have a width, a length which perfectly equals the width, and a depth which essentially equals half the width. The sphere may comprise a diameter which is approximately equal to the width. Each of the first and second panels may be provided with at least two recesses. The method may further comprise forming the at least two recesses on the surface of the first panel in a first configuration and forming the at least two recesses on the surface of the second panel in a second configuration, the first configuration being a mirror image configuration of the second configuration.

One of the at least one recess of the first panel and the at least one recess of the second panel may comprise an approximately cylindrically shaped opening. The cylindrically shaped opening may have a circular width and a depth which equals approximately half the circular width. The sphere may comprise a diameter which is approximately equal to the circular width. One of the at least one recess of the first panel and the at least one recess of the second panel may comprise an approximately spherical shaped opening. The spherical shaped opening may have a diameter and a depth which equals approximately half the diameter. The sphere may comprise a diameter which is approximately equal to the diameter of the spherical shaped opening. Each of the at least one recesses may comprise a hemispheric shape.

The sphere comprises at least one of a metal ball, a steel ball, a stainless steel, and a ball bearing. The method may further comprise providing a clearance between the sphere and the at least one recess of at least one of the first and the second panels. The method may further comprise forming the at least two recesses on the surface of the first panel in a first configuration and forming the at least two recesses on the surface of the second panel in a second configuration, the first configuration being dimensioned to correspond to the second configuration and to account for tolerance differences between the first and second configurations.

A diameter of the sphere may be in the range of approximately 10 mm to approximately 15 mm. A diameter of the sphere may be approximately 13 mm. The method may further comprise providing a clearance between the sphere and the at least one recess of at least one of the first and the second panels, whereby the clearance is in the range of between approximately 0.3 mm to approximately 0.5 mm. Each of the first and second panels may be horizontally arranged.

The invention also provides for a piece of furniture including at least two panels which are connected or joined together. The piece of furniture comprises a first panel having a surface with at least one recess and a second panel having a surface with at least one recess. The surface of the first panel is arranged adjacent to the surface of the second panel. The first panel is connected to the second panel using at least one sphere. The sphere projects into the at least one recess of each of the first and the second panels.

One of the at least one recess of the first panel and the at least one recess of the second panel may comprise an approximately square shaped cross-sectional opening. The square shaped cross-sectional opening may have a width, a length which perfectly equals the width, and a depth which essentially equals half the width. The sphere may comprise a diameter which is approximately equal to the width. Each of the first and second panels may be provided with at least two recesses. The at least two recesses on the surface of the first panel may be arranged in a first configuration and the at least two recesses on the surface of the second panel may be arranged in a second configuration, the first configuration being a mirror image configuration of the second configuration.

One of the at least one recess of the first panel and the at least one recess of the second panel may comprise an approximately cylindrical shaped opening. The cylindrical shaped opening may have a circular width and a depth which equals approximately half the circular width. The sphere may comprise a diameter which is approximately equal to the circular width. One of the at least one recess of the first panel and the at least one recess of the second panel may comprise an approximately spherical shaped opening. The spherical shaped opening may have a diameter and a depth which equals approximately half the diameter. The sphere may comprise a diameter which is approximately equal to the diameter of the spherical shaped opening. Each of the at least one recesses may comprise a hemispheric shape.

The sphere may comprise at least one of a metal ball, a steel ball, a stainless steel, and a ball bearing. The piece of furniture may further comprise a clearance between the sphere and the at least one recess of at least one of the first and the second panels. The piece of furniture may further comprise at least two recesses on the surface of the first panel arranged in a first configuration and at least two recesses on the surface of the second panel arranged in a second configuration, the first configuration being dimensioned to correspond to the second configuration and to account for tolerance differences between the first and second configurations.

A diameter of the sphere may be in the range of approximately 10 mm to approximately 15 mm. The diameter of the sphere may be approximately 13 mm. The piece of furniture may further comprise a clearance between the sphere and the at least one recess of at least one of the first and the second panels, whereby the clearance is in the range of between approximately 0.3 mm to approximately 0.5 mm. Each of the first and second panels may be horizontally arranged.

The invention further provides for a piece of furniture including at least two components which are connected or joined together. The piece of furniture comprises a first component having a first horizontal panel and a first vertical panel. At least the first horizontal panel includes at least one recess. A second component having a second horizontal panel and a second vertical panel is provided. At least the second horizontal panel includes at least one recess. The first horizontal panel is arranged adjacent to the second horizontal panel. The first horizontal panel is connected to the second horizontal panel using at least one mechanism. The at least one mechanism is freely movably mounted within and projects into each of the at least one recess of each of the first and the second horizontal panels.

The at least two components are modular components adapted to form at least one of a bookshelf, a rack, and a shelf. At least one of the at least two components includes at least one of a door and a glass pane.

The term "essentially horizontal panels" is understood to signify that the position of the two panels, which must be parallel to each other, does not deviate much from the horizontal position, i.e., an arrangement in which a deviation from the horizontal is not of many degrees (e.g. of 10°). In particular, a criterion in determining whether two panels are essentially horizontal is seen in the fact that they do not slide, if placed on top of each other, under the influence of gravity force, overcoming the friction between their surfaces.

The term "essentially (or "approximately") equal dimensions" among the panels, e.g. that "the depth of the recess is essentially equal to half its width" or that "the diameter of the sphere is essentially (or "approximately") equal to the width of the recess" are understood to signify that such dimensions can take inevitable manufacturing tolerances into account, the recesses thus always being somewhat larger than the spheres placed into them, be it for not forcing the spheres into the recesses, or be it for taking into account the manufacturing tolerances in the distances between the recesses, or be it, lastly, for taking into account the natural variability of such distances due to dilatations to which the material of the panel can be subjected.

BRIEF DESCRIPTION OF THE DRAWINGS

The present invention is further described in the detailed description which follows, in reference to the noted plurality of drawings by way of non-limiting examples of embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1A:
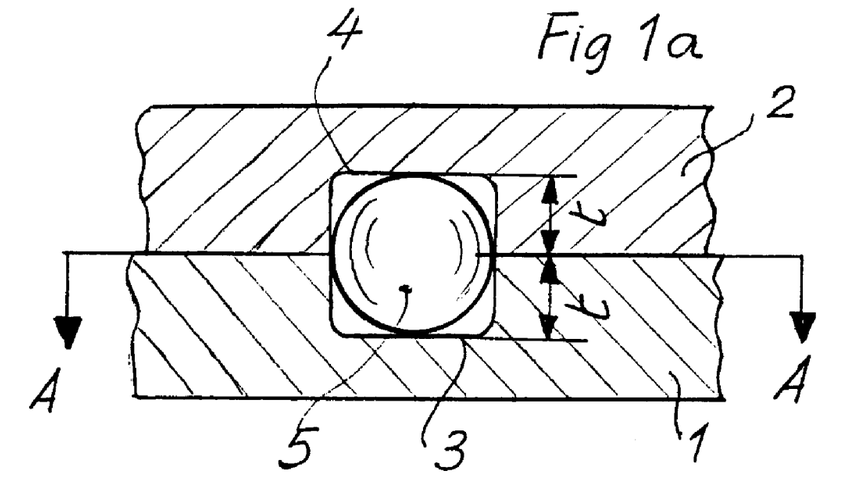
FIG. 1a shows an arrangement in cross-section according to first variant of the invention.
Figure 1B:
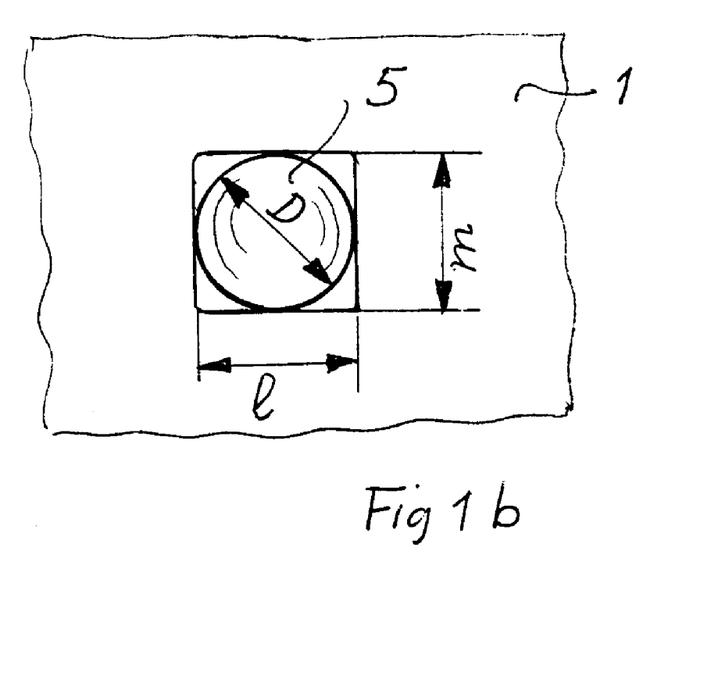
FIG. 1b shows a top view according to the section A—A indicated in the FIG. 1a of the first variant.

In FIGS. 1a and 1b one inventive arrangement is shown in which the conjunction is based on form contact between two elements. The concept "based on form contact" signifies that two parts or elements are mutually joined only owing to their geometric form, and thus without the influence of any outer force (nuts and bolts or similar devices) to keep them together.

As seen in FIGS. 1a and 1b, a lower panel 1 made from wood or any other suitable material is arranged to support an upper panel 2. The upper panel 2 is positioned resting with its weight against the lower panel 1 in an essentially horizontal position.

In order to join the two panels 1 and 2 based on form contact at one ore more points (as will be explained in more detail later), there is provided, in each of the surfaces of the panels 1 and 2 (i.e, the surfaces which contact each other) at least one recess 3, 4. Thus, lower panel 1 has at least one recess 3 and upper panel 2 has at least one recess 4. Each recess 3, 4, may have a width "l" which is approximately equal to the length "m", and a depth "t" which is approximately equal to half the width "l" (i.e., t=½). The conjunction between the two panels 1 and 2 is effected and/or created using a sphere or ball 5 whose diameter "D" is approximately equal to the width "l" of the recesses 3 and 4 of the surfaces of the two panels 1, 2 to be joined.

Owing to the essential absence of play between the sphere 5 and the recesses 3 and 4 (apart from a small play or clearance which is allowed for taking into account the manufacturing tolerances, as it will be explained with reference to a preferred description of the present invention) the conjunction between the two panels 1 and 2 remains unambiguous while the two panels 1, 2 rest one on top of the other. In a vertical position (i.e., when the panels are arranged side by side in an approximately vertical position)

the gravitational force which would normally (i.e., when the panels are arranged horizontally) press panel 2 onto panel 1, is of course absent, and the inventive conjunction would not function.

For this reason and refraining from exerting other forces than gravity onto the panels 1 and 2 on purpose, the inventive arrangement of the conjunction is essentially adapted for use with two panels 1, 2 that are placed in an essentially horizontal position. It should be noted, however, that the use of the inventive arrangement of conjunction as a centering element (and not of conjunction) can well be applied for vertical panels, as will be explained in the following with reference to an example of a particular application of the inventive arrangement. While the inventive arrangement is primarily an arrangement of conjunction based on form contact between essentially horizontal panels, it can be expanded to be used with other non-horizontal joining.

Thus, if between the two panels 1 and 2 a single inventive arrangement of conjunction is provided, it will be possible to rotate one panel relative to the other about the center of the sphere 5, in which case a conjunction is obtained with freedom of rotational movement between the two panels 1 and 2. This arrangement can be advantageous for certain applications in the field of furniture (e.g. for realizing rotatable horizontal trays for television sets).

Figure 4A:
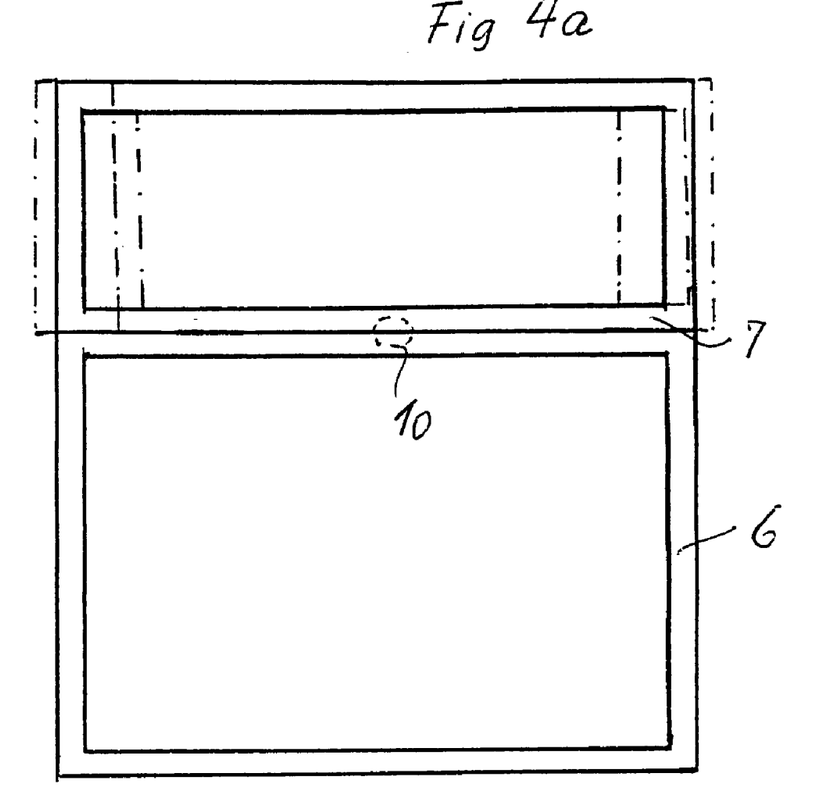
FIG. 4a illustrates a front view of a piece of furniture having two elements and utilizing the arrangement according to the invention, in which one element can be rotated against the other.
Figure 4B:
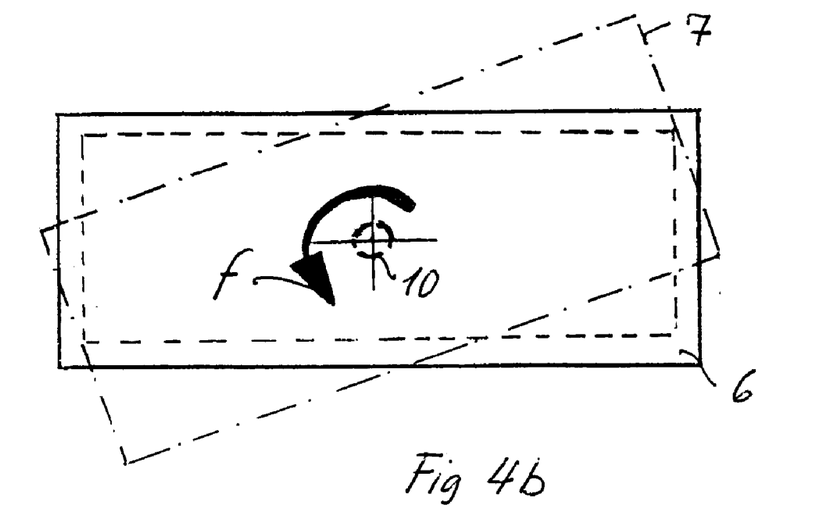
FIG. 4b illustrates a top view of FIG. 4a, i.e., showing a piece of furniture having two elements and utilizing the arrangement according to the invention, in which one element can be rotated against the other.

An arrangement of the type mentioned above is shown in the FIGS. 4a and 4b in which a combination piece of furniture is shown composed of a lower element 6 and an upper element 7 that is joined by a single inventive arrangement of conjunction 10. The upper element 7 can be rotated in a circular direction about the arrangement of conjunction 10, as indicated by the arrow "f". Such an arrangement allows for the upper element 7 to be oriented and rotated clockwise or counterclockwise and in all directions in the room.

Of course, if at least two recesses are provided in each of the mutual support surfaces, the conjunction is rendered unambiguous and/or static, i.e., the two parts are joined in such a manner that they can not be moved along the two mutual support surfaces. This situation is illustrated, in the sense of one example, in FIGS. 5a and 5b. Here a piece of furniture is shown which includes a lower element 6 and an upper element 7. The upper element 7 has a lower panel 9 which rests against the upper panel 8 of the lower element 6. Arranged between these panels 8 and 9 are two inventive arrangements of conjunction, i.e., connection points or areas 11a and 11b. These are schematically represented by the outline of respective spheres, and are arranged in mirror symmetric positions in such a manner that they can cooperate as the upper surface of the panel 8 contacts the lower surface of the panel 9.

Figure 5A:
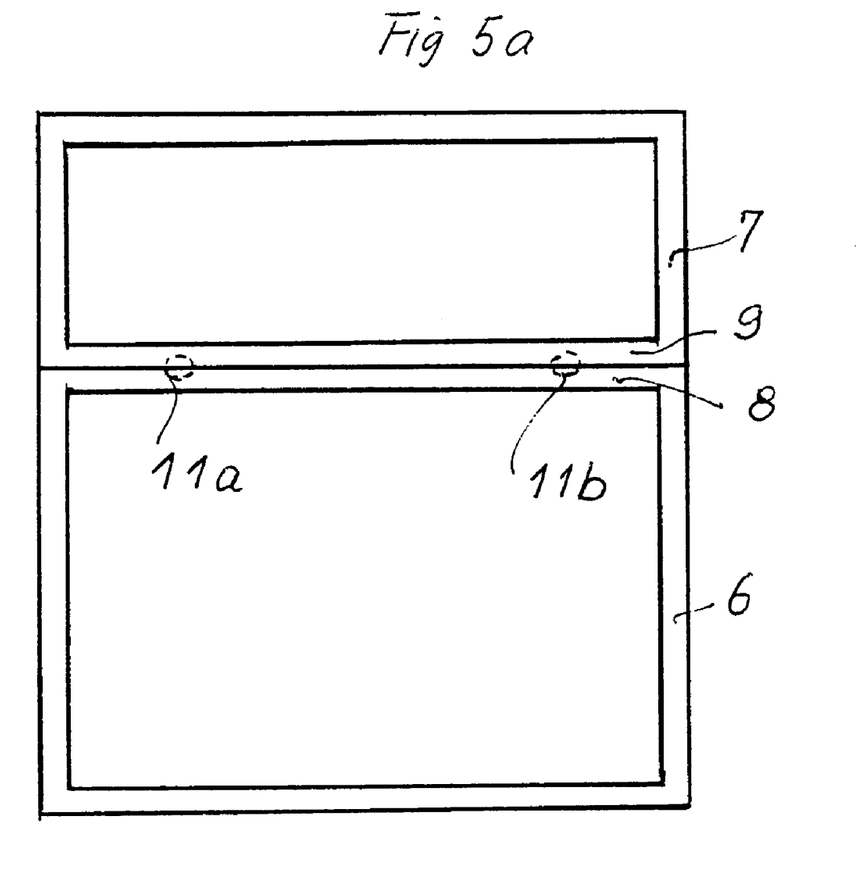
FIG. 5a illustrates a front view of a piece of furniture having two elements and utilizing another arrangement according to the invention, in which one element can be held stationary and/or rendered non-movable against the other.
Figure 5B:
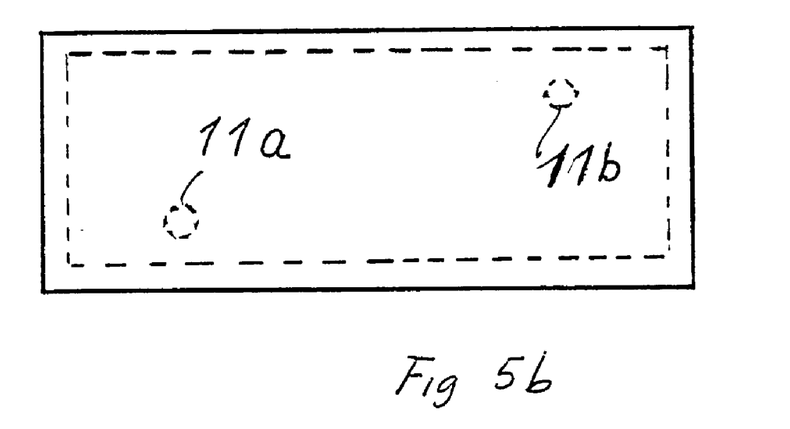
FIG. 5b illustrates a top view of FIG. 5a, i.e., showing a piece of furniture having three elements and utilizing another arrangement according to the invention, in which one element can be held stationary and/or rendered non-movable against the other.

It should be understood that the two horizontal panels 8 and 9 can be joined or united with the help of any number of inventive arrangements of conjunction and/or which are arranged in any number of positions or locations of the contact surfaces of the panels 8 and 9. However, it suffices if the positions of the recesses in the panels are arranged in perfect mirror symmetry, so that the upper element 7 can be perfectly aligned with the lower element 6.

As a rule, however, two arrangements of conjunction placed between two surfaces are sufficient for ensuring a secure conjunction of two panels. In the case where the piece of furniture has more than two elements, under certain conditions, it is possible to utilize only a single arrangement of conjunction for joining each set of two panels, without the risk that one panel could rotate on the other. Such an arrangement can be seen in FIGS. 7a and 7b. The furniture designer thus has ample liberty of choice in this respect in planning composition furniture.

Figure 2A:
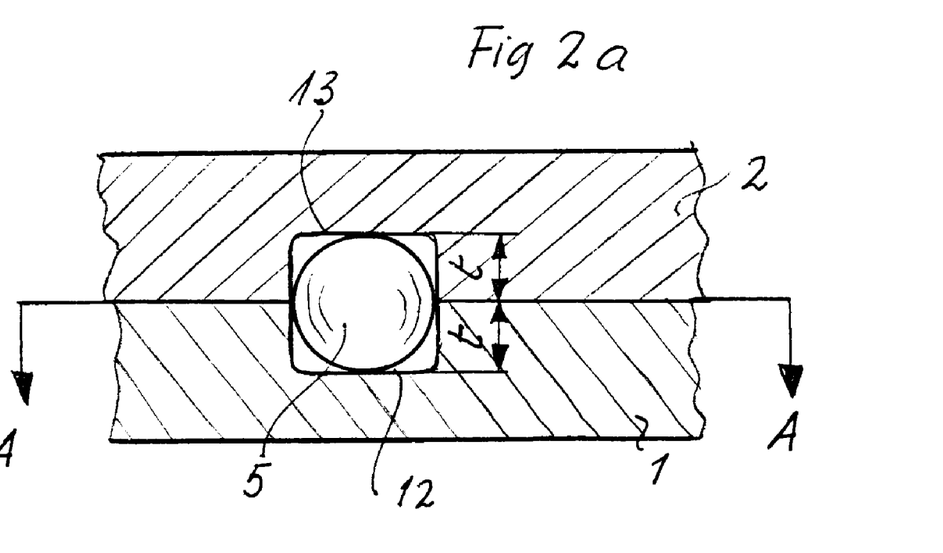
FIG. 2a shows an arrangement in cross-section according to a second variant of the invention.
Figure 2B:
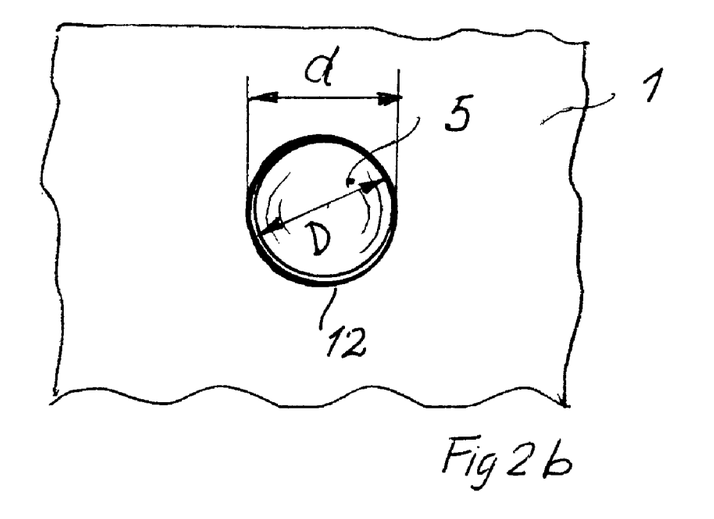
FIG. 2b shows a top view according to the section A—A indicated in the FIG. 2a of the second variant.

With reference to FIG. 1, it can be seen that recesses 3 and 4 are of approximately square form and thus may be quite difficult to sink and/or form into panels 1 and 2, unless the panels 1 and 2 are prefabricated with such (e.g., if the panels are press molded or otherwise formed from plastic or metal, they may be formed to automatically include such recesses which would obviate the need for secondary processes to produce the recesses). For this reason, a second preferred variant of the invention of the present invention is shown in FIGS. 2a and 2b (in which the common elements shown in FIGS. 1a and 1b are designated using the same reference numerals), the recesses 12, 13 are shaped cylindrically and their depth "t" is essentially equal to half the diameter "d" of the cylinder 12, 13, which diameter in turn essentially corresponds to the diameter "D" of the sphere 5. As can be seen in FIG. 2b, a certain difference between "D" and "d" is shown (i.e., a clearance space), exaggerated for this purpose, where in reality "d" is just slightly larger than "D" in such a manner that the sphere 5 finds room in the recesses 12 and 13 with some small play.

Figure 3A:
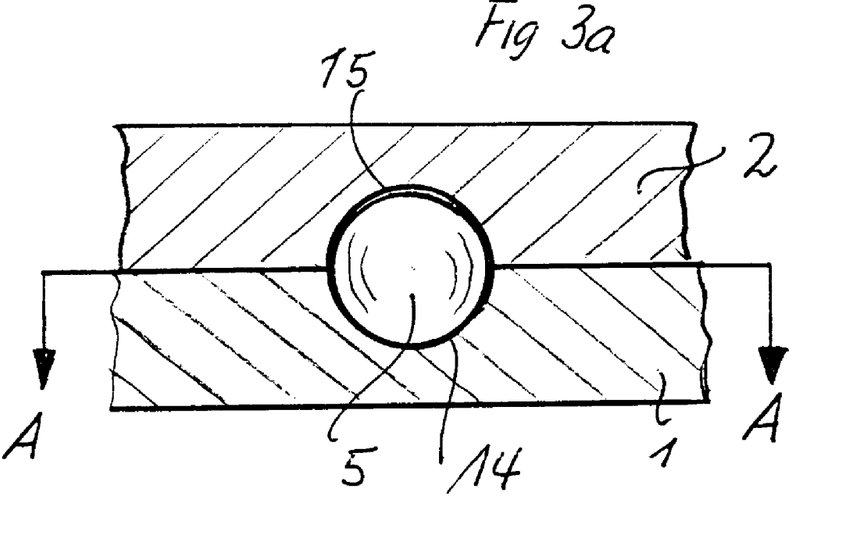
FIG. 3a shows an arrangement in cross-section according to a third variant of the invention.
Figure 3B:
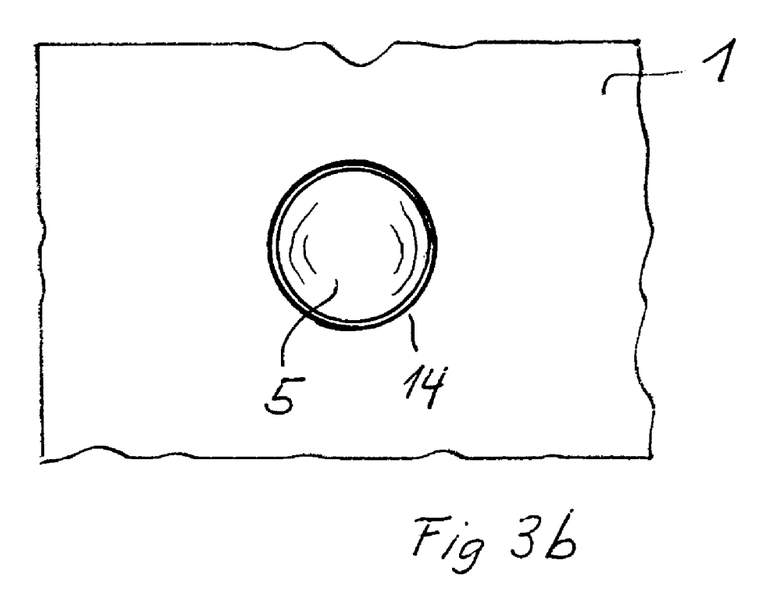
FIG. 3b shows a top view according to the section A—A indicated in the FIG. 3a of the third variant.

Another preferred form of the invention is illustrated in FIGS. 3a and 3b, which basically corresponds to the one shown in FIGS. 1a and 1b, and in FIGS. 2a and 2b. According to this variant, the recesses 14 and 15 are of hemispheric form and/or partially spherical. Here, it is to be noted that between the sphere 5 and the recesses 14 and 15, respectively, a certain play or clearance also prevails, which in the figures is shown exaggerated. The function of this play has been described before with reference to FIGS. 2a and 2b, i.e., the depth "t" of the recesses 14 and 15 is slightly larger than the diameter "D" of the sphere 5 in the sense of a normal oversize tolerance. It should be noted that in each of the embodiments this can be in the range of, e.g. from approximately 0.1 to approximately 0.5 mm. However, the invention is not limited to these values.

The advantage of the solution according to FIGS. 3a and 3b is seen in that the sphere 5 rests against the wall of the recess 14, or 15 respectively, on its whole surface in such a manner that the problems of local deformation of the recesses are substantially reduced if not eliminated completely, i.e., this design results in more surface contact between the sphere 5 and recesses 14 and 15. Furthermore, such hemispheric recesses 14, 15 are easily manufactured with the help of a suitably profiled moulding or milling tool, e.g., using a rounded bottom milling cutter.

According to a further preferred variant of the present invention, it is provided that the tolerances in the dimensions of the recesses 3, 4; 12, 13; 14, 15 take account of the tolerances which can result due to the distances between the points of conjunction present in two panels 1, 2, and 8, 9 respectively, as well as of possible dilatation of the panels 1, 2; 8, 9 due to the usual variations in temperature and humidity to which the panels 1, 2; 8, 9 are subject in practical use. This can be important in attempting to align the panels or elements to each other. Normally, the tolerances mentioned are on the order of a few tenths of a millimeter. However, for very large panels, especially when exposed to intense thermal excursions, it might be necessary to provide adequate larger tolerances. It will be left to the specialist in the field to determine the most adequate tolerances from case to case.

According to a preferred form of the present invention, the sphere 5 should be a steel ball. However, other metals may be utilized such as stainless steel, brass, bronze, etc. Moreover, the invention also contemplates, in certain situations, that the balls be made of plastics, rubbers, and/or composites. However, steel of the type used in ball bearings is preferred because they are cheap and readily available. By using such a ball, the invention can be practiced in an economically very feasible manner and utilizing great precision. The invention contemplates that the sphere 5, or the steel ball respectively, can have any diameter which satisfies the user. However, a diameter "D" ranging from approximately 10 to approximately 15 mm is preferred. Moreover, it is even more preferred that the diameter "D" equals approximately 13 mm. These dimensions have proven ideal in most applications of the present invention, especially if composition furniture is to be realized that is intended to be used as racks, shelves or bookshelves.

According to a further preferred form of the present invention, the oversize tolerance of the width "l", the length "m", and diameter "d" of the recess 3, 4; 12, 13; 14, 15 is designed with respect to the diameter "D" of the sphere 5 to be less than approximately 0.5 mm, whereas the oversize tolerance of the depth "t" of the recess 3, 4; 12, 13; 14, 15 is designed with respect to the radius D/2 of the sphere 5 to be less than approximately 0.3 mm.

The dimensional characteristics of the invention, as outlined above, chosen with reference to the optimal application of the inventive arrangement does not exclude, however, the possibility that in particular cases such limits can be exceeded, but still are within the scope of the present invention.

Figure 6:
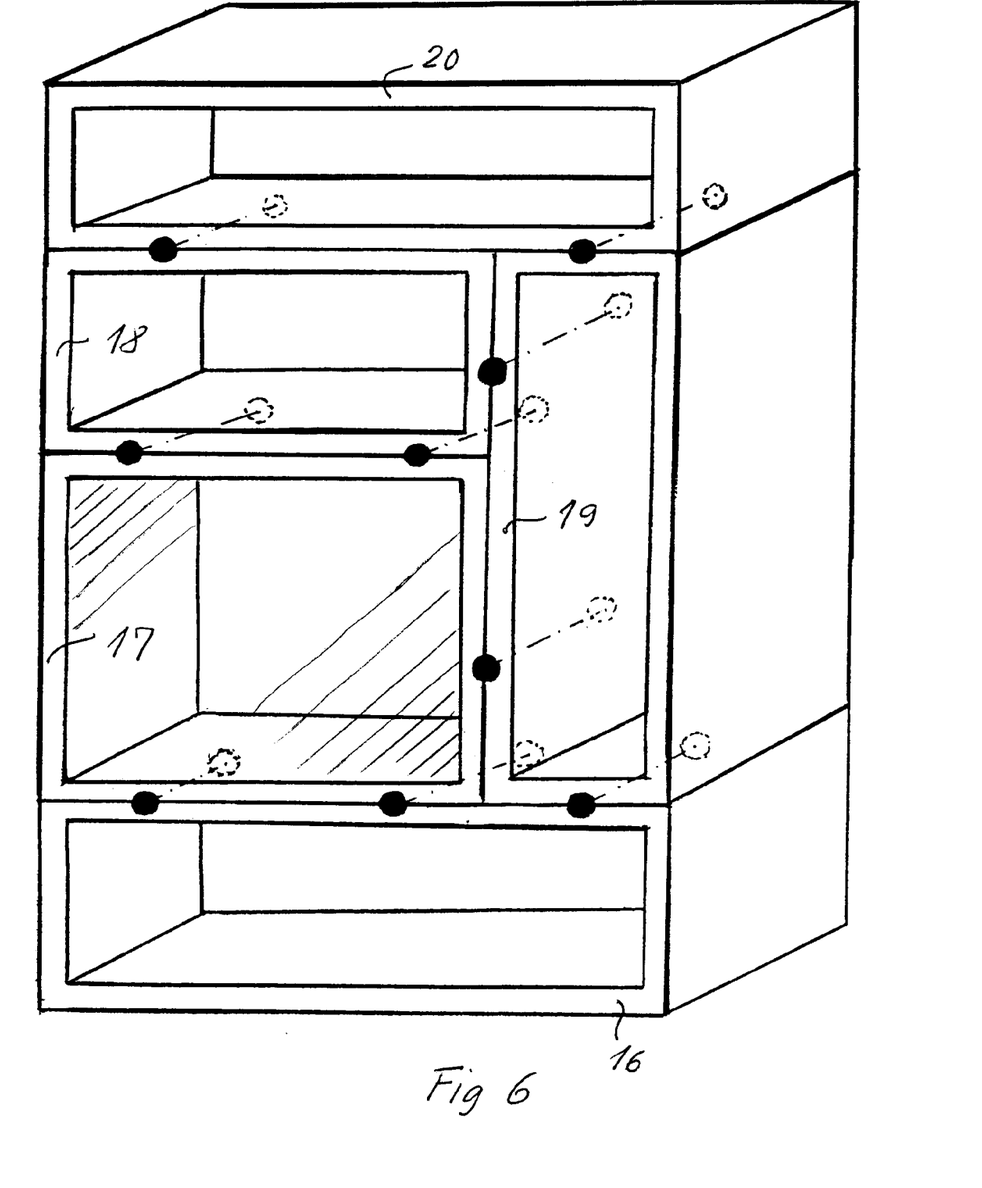
FIG. 6 shows a perspective view of a piece of furniture which includes a plurality of components or elements that are joined together using arrangements according to the present invention.

In FIG. 6, a particularly interesting application of the inventive arrangement is shown, which also is the object of the invention. In FIG. 6, it can be seen that five furniture components or elements are assembled. A first horizontal component 16 extends over a full width of the piece of furniture and forms the bottom of the piece of furniture. Positioned on top of component 16 are three central components 17, 18 and 19, with an upper horizontal component 20 extending over the full width of the piece of furniture. These five components 16 through 20 are mutually joined or united with the help of nine inventive arrangements of conjunction, indicated by black spheres in their projection onto the vertical front plane of the piece of furniture, and with dashed lines in their actual conjunction positions of the panels.

This demonstrates that the inventive arrangement of conjunction can be applied for joining pairs of essentially horizontal panels, such as the ones separating the components 16 and 17; 17 and 18, and/or 18 and 20, as well as for joining pairs of vertical panels, such as the ones separating the components 17 and 19, and 18 and 19. In this case it is required however, that the components 17 and 19 and 18 and 19, which comprise pairs of essentially vertical panels, be mutually joined by at least one component of the piece of furniture (16 and/or 20 in this specific case) which joins along a horizontal plane the two components 17, 19 or 18 and 19 and which contains the two vertical panels. Experience has proven that application of the inventive conjunction arrangements for pairs of vertical panels is also within the scope of the invention in a piece of furniture composed of a great number of elements, which lends excellent stability to the piece of furniture, making it also possible to make use of the joining characteristic of the inventive arrangement of conjunction for panels arranged vertically.

Figure 7A:
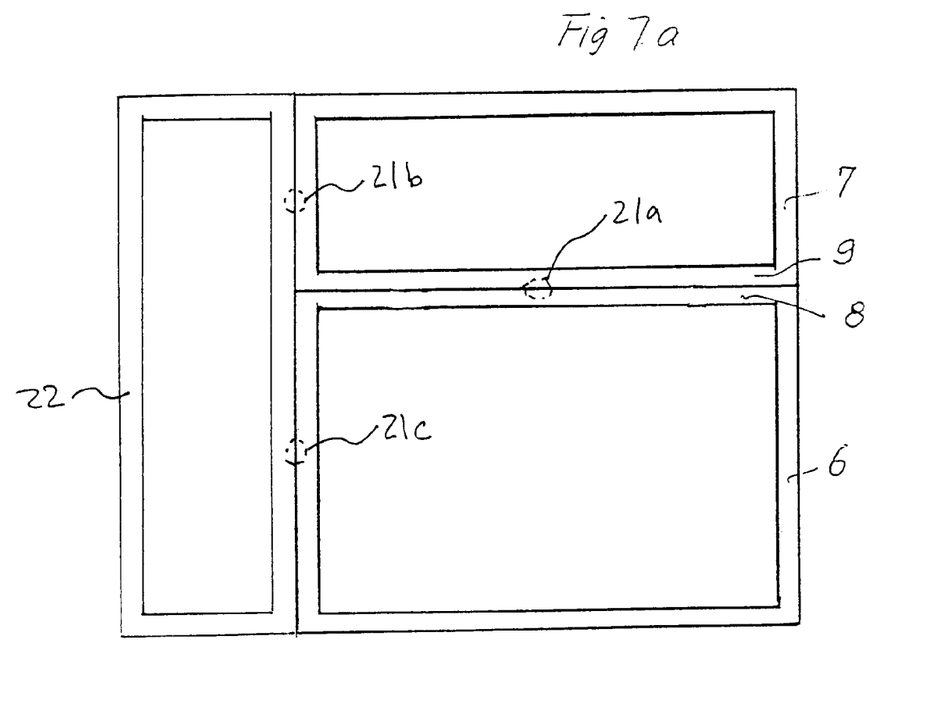
FIG. 7a illustrates a front view of a piece of furniture having three elements and utilizing another arrangement according to the invention, in which each element can be held stationary and/or rendered non-movable against the other using only three arrangements.
Figure 7B:
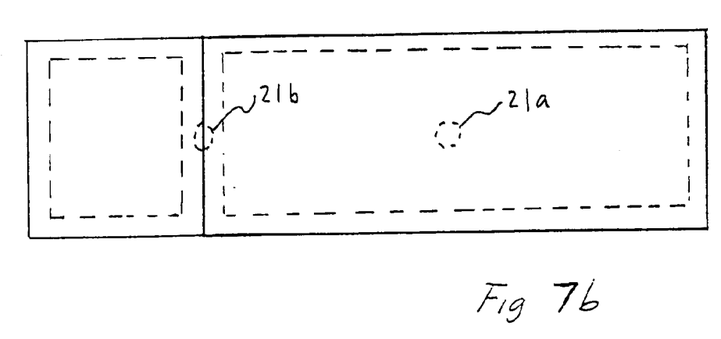
FIG. 7b illustrates a top view of FIG. 7a, i.e., showing a piece of furniture having three elements and utilizing another arrangement according to the invention, in which each element can be held stationary and/or rendered non-movable against the other using three arrangements.

In FIGS. 7a and 7b, a simplified version of the application of the invention is shown. In FIGS. 7a and 7b, it can be seen that three furniture components or elements are assembled. A first horizontal component 6 extends beneath component 7 and forms a portion of the bottom of the piece of furniture. Positioned on a side of the component 6 is a single vertical component 22. These three components 6, 7 and 22 are mutually joined or united with the help of three inventive arrangements of conjunction, indicated by dashed lines in their actual conjunction positions of the panels. According to this arrangement, each set of contact surfaces between the components 6, 7 and 22 only utilize a single inventive arrangement of the conjunction. Thus, contact surfaces between components 6 and 22 utilize arrangement 21c, while contact surfaces between components 6 and 7 utilize arrangement 21a, and while contact surfaces between components 7 and 22 utilize arrangement 21b. Such an arrangement uses a small amount of balls to create a stable piece of furniture. Of course, the invention also contemplates an even simpler version wherein only two of the three contact surface sets use an arrangement, e.g., such as when contact surfaces between components 6 and 22 utilize arrangement 21c, while contact surfaces between components 6 and 7 utilize arrangement 21a, but with no arrangement 2b being utilized on contact surfaces between components 7 and 22.

It has been found that the present invention can be utilized to the greatest extent of its potential, if the components of a piece of furniture are modular components, i.e. components presenting dimensions according to well studied modules apt to compose bookshelves and/or shelves, open or provided with doors and or glass panes. In FIG. 6, an example is shown of such type of the present invention.

The inventive arrangement of conjunction is distinguished by its great simplicity in manufacture, its low cost and its versatility of application. It permits realization of combination furniture, which in practical use can be remodeled any time without the use of tools and without the help of furniture mounting specialists. The pieces of furniture, which can be composed in this manner present great rigidity and absolutely ensure stability even without fixation based on application of forces.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method of connecting or joining at least two panels in a piece of furniture, comprising:

providing a first panel, wherein the first panel includes a surface having at least one recess;

providing a second panel, wherein the second panel includes a surface having at least one recess;

arranging the surface of the first panel in form contact with the surface of the second panel; and connecting the first panel to the second panel using at least one sphere, wherein the at least one sphere projects into the at least one recess of each of the first and the second panels, and further comprising one of:

at least one of the at least one recess of the first panel and the at least one recess of the second panel comprises an approximately square-shaped cross-sectional opening wherein the square shaped cross-sectional opening has a width, a length which essentially equals the width, and a depth which essentially equals half the width; and at least one of the at least one recess of the first panel and the at least one recess of the second panel comprises an approximately circular-shaped cross-sectional opening wherein the circular-shaped cross-sectional opening has a diameter, and a depth which essentially equals half the diameter.

2. The method of claim 1, wherein at least one of the at least one recess of the first panel and the at least one recess of the second panel comprises an approximately square-shaped cross-sectional opening.

3. The method of claim 1, wherein the sphere comprises a diameter which is approximately equal to the width.

4. The method of claim 1, wherein each of the first and second panels is provided with at least two recesses.

5. The method of claim 4, further comprising forming the at least two recesses on the surface of the first panel according to a first configuration and forming the at least two recesses on the surface of the second panel according to a second configuration, the first configuration being a mirror image configuration of the second configuration.

6. The method of claim 1, wherein one of the at least one recess of the first panel and the at least one recess of the second panel comprises an approximately cylindrically-shaped opening.

7. The method of claim 6, wherein the cylindrically-shaped opening has a circular width and a depth which equals approximately half the circular width.

8. The method of claim 7, wherein the at least one sphere comprises a diameter which is approximately equal to the circular width.

9. The method of claim 1, wherein one of the at least one recess of the first panel and the at least one recess of the second panel comprises an approximately spherical-shaped opening.

10. The method of claim 9, wherein the at least one sphere comprises a diameter which is approximately equal to the diameter of the spherically shaped opening.

11. The method of claim 1, wherein each of the at least one recesses comprises a hemispheric shape.

12. The method of claim 1, wherein the at least one sphere comprises at least one of a metal ball, a steel ball, a stainless steel ball, and a ball bearing.

13. The method of claim 1, further comprising providing a clearance between the at least one sphere and the at least one recess of at least one of the first and the second panels.

14. The method of claim 1, wherein the at least one recess of the first panel includes at least two recesses formed on the surface of the first panel according to a first configuration and wherein the at least one recess of the second panel includes at least two recesses formed on the surface of the second panel according to a second configuration, the first configuration being dimensioned to correspond to the second configuration and to account for tolerance differences between the first and second configurations.

15. The method of claim 1, wherein a diameter of the at least one sphere is in the range of approximately 10 mm to approximately 15 mm.

16. The method of claim 15, wherein a diameter of the at least one sphere is approximately 13 mm.

17. The method of claim 1, further comprising providing a clearance between the at least one sphere and the at least one recess of at least one of the first and the second panels, whereby the clearance is in the range of between approximately 0.3 mm to approximately 0.5 mm.

18. The method of claim 1, wherein each of the first and second panels is horizontally arranged.

19. A piece of furniture including at least two panels which are connected or joined together, comprising:

a first panel having a surface with at least one recess;

a second panel having a surface with at least one recess;

the surface of the first panel being arranged in form contact with the surface of the second panel; and the first panel being connected to the second panel using at least one sphere, wherein the at least one sphere projects at least partially into the at least one recess of each of the first and the second panels, and further comprising one of:

at least one of the at least one recess of the first panel and the at least one recess of the second panel comprises an approximately square-shaped cross-sectional opening wherein he square shaped cross-sectional opening has a width, a length which essentially equals the width, and depth which essentially equals half the width; and at least one of the at least one recess of the first panel and the at least one recess of the second panel comprises an approximately circular-shaped cross-sectional opening wherein the circular-shaped cross-sectional opening has a diameter, and a depth which essentially equals half the diameter.

20. The piece of furniture of claim 19, wherein at least one of the at least one recess of the first panel and the at least one recess of the second panel comprises an approximately square-shaped cross-sectional opening.

21. The piece of furniture of claim 19, wherein the at least one sphere comprises a diameter which is approximately equal to the width.

22. The piece of furniture of claim 19, wherein each of the first and second panels is provided with at least two recesses.

23. The piece of furniture of claim 22, wherein the at least two recesses the surface of the first panel is arranged according to a first configuration and wherein the at least two recesses on the surface of the second panel is arranged according to a second configuration, the first configuration being a mirror image configuration of the second configuration.

24. The piece of furniture of claim 19, wherein one of the at least one recess of the first panel and the at least one recess of the second panel comprises an approximately cylindrically shaped opening.

25. The piece of furniture of claim 19, wherein the at least one sphere comprises a diameter which is approximately equal to the diameter.

26. The piece of furniture of claim 19, wherein at least one of the at least one recess of the first panel and the at least one recess of the second panel comprises an approximately spherically shaped opening.

27. The piece of furniture of claim 26, wherein the spherically shaped opening has a depth which equals approximately half the diameter.

28. The piece of furniture of claim 27, wherein the at least one sphere comprises a diameter which is approximately equal to the diameter of the spherically shaped opening.

29. The piece of furniture of claim 19, wherein each of the at least one recesses comprises a hemispheric shape.

30. The piece of furniture of claim 19, wherein the at least one sphere comprises at least one of a metal ball, a steel ball, a stainless steel ball, and a ball bearing.

31. The piece of furniture of claim 19, further comprising a clearance between the at least one sphere and the at least one recess of at least one of the first and the second panels.

32. The piece of furniture of claim 19, further comprising at least two recesses on the surface of the first panel arranged according to a first configuration and at least two recesses on the surface of the second panel arranged according to a second configuration, the first configuration being dimensioned to correspond to the second configuration and to account for tolerance differences between the first and second configurations.

33. The piece of furniture of claim 19, wherein a diameter of the at least one sphere is in the range of approximately 10 mm to approximately 15 mm.

34. The piece of furniture of claim 33, wherein a diameter of the at least one sphere is approximately 13 mm.

35. The piece of furniture of claim 19, further comprising a clearance between the at least one sphere and the at least one recess of at least one of the first and the second panels, whereby the clearance is in the range of between approximately 0.3 mm to approximately 0.5 mm.

36. The piece of furniture of claim 19, wherein each of the first and second panels is horizontally arranged.

37. A piece of furniture including at least two components which are connected or joined together, comprising:
- a first component having a first horizontal panel and a first vertical panel;
- at least the first horizontal panel includes at least one recess;
- a second component having a second horizontal panel and a second vertical panel;
- at least the second horizontal panel includes at least one recess;
- the first horizontal panel being arranged in form contact with the second horizontal panel;
- the first horizontal panel being connected to the second horizontal panel using at least one mechanism;
- the at least one mechanism being freely movably mounted within the at least one recess of each of the first and second horizontal panels; and
- each of the at least one recesses having a depth and one of a width and a diameter, wherein the depth is essentially equal to half of the width or the diameter,
- wherein the at least one mechanism projects essentially halfway into the at least one recess of each of the first and the second panels.

38. The piece of furniture of claim 37, wherein the at least two components are modular components adapted to form at least one of a bookshelf, a rack, and a shelf.

39. The piece of furniture of claim 37, wherein at least one of the first and second components includes at least one of a door and a glass pane.

40. A piece of furniture including at least two components which are connected or joined together, comprising:
- a first component having a first panel which comprises a first thickness and a first recess;
- a second component having a second panel which comprises a second thickness and a second recess;
- the first horizontal panel being arranged in form contact with the second horizontal panel;
- the first horizontal panel being coupled to the second horizontal panel via at least one spherical member;
- the first recess having a depth and either a width or a diameter, the first depth being essentially equal to half of the width or the diameter, and the first depth being less than the first thickness;
- the second recess having a depth and either a width or a diameter, the second depth being essentially equal to half of the width or the diameter, and the second depth being less than the second thickness; and
- the at least one spherical member projects essentially halfway into the first and second recesses of each of the first and the second panels when the first panel is in form contact with the second panel.

41. The piece of furniture of claim 40, wherein the first recess comprises at least two recesses and wherein the second recess comprises at least two recesses.

* * * * *